United States Patent Office 2,870,200
Patented Jan. 20, 1959

2,870,200

PRODUCTION OF UNSATURATED POLY-CARBOXYLIC ACIDS AND ESTERS

Morris S. Kharasch and Walter Nudenberg, Chicago, Ill., assignors to Shell Development Company, New York, N. Y., a corporation of Delaware No Drawing. Application May 24, 1954
Serial No. 432,026

9 Claims. (Cl. 260—533)

This invention relates to a new class of unsaturated carboxylic acids having a plurality of carboxylic acid groups and containing at least two ethylenic double bonds in the molecule, and to novel derivatives of these acids. It deals with a new and efficient method whereby these polyethylenic polycarboxylic acid compounds can be produced and also with new organic compounds which can be so obtained and with their derivatives.

The new process gives as its principal product polycarboxylic acids and esters thereof which can be represented by the general formula:

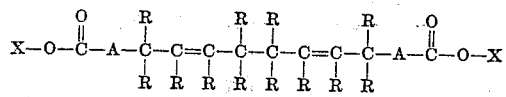

In this formula the A's represent divalent radicals, each having a divalent chain of 3 to 9 carbon atoms. The R's represent hydrogen or halogen atoms, functional groups such as hydroxy, nitro, cyano, carboxy, ester, ether, thioether and sulfone groups, or the same or different hydrocarbon radicals of 1 to 12 carbon atoms, for instance, alkyl, cycloaliphatic and aromatic hydrocarbon radicals, which hydrocarbon radicals can be substituted by the foregoing functional groups or by halogen atoms. X in the formula is a hydrogen atom or a hydrocarbon radical, for instance, an alkyl radical, containing 1 to 12 carbon atoms.

The process provides a particularly attractive method for the commercial scale manufacture of diethylenic dicarboxylic acids and esters of such acids. These new compounds are characterized by a chain of 16 to 28 carbon atoms linking together two carboxyl groups and containing two ethylenic linkages in non-conjugated relationship to each other and each separated by at least 4 carbon atoms from the nearest of said carboxyl groups. This unique structure imparts a very advantageous combination of properties to the new compounds. The new diethylenic dicarboxylic acids produced by the new process are especially valuable because of their ability to undergo the reactions of polycarboxylic acids and of ethylenic compounds with little danger of the undesirable polymerization to which acids containing conjugated systems of unsaturated linkages are subject in such reactions. This makes these new acids especially suitable for the synthesis of condensation polymers, for example, polyamides, which can be prepared as linear compounds and then reacted at the ethylenic bonds to produce cross-linked products or can be thus joined to other compounds, for instance, other polymers containing reactive groups or linkages. The new acids, particularly in the form of their esters, are also useful as reactive plasticizers and have been found suitable for plasticizing nitrocellulose and poly(vinyl chloride) resins. The esters have also found use as synthetic lubricants. Acids having these advantageous properties have not hitherto been readily available and could have been produced only by elaborate synthetic procedures which are not economically feasible on a technical scale.

It has been discovered that the new diethylenic polycarboxylic acid compounds of the invention can be produced in good yields in a relatively simple manner by reacting, under redox conditions, a conjugated diethylenic compound, for instance, a conjugated diethylenic hydrocarbon or substituted conjugated diethylenic hydrocarbon containing as substituents one or more of the previously mentioned functional groups or halogen atoms, or a mixture of two or more such conjugated diolefinic compounds with one or more cyclic peroxide compounds having a special structure. The essential feature of these cyclic peroxide compounds is that they contain 4 to 10 carbon atoms in a primary ring having a hydroxyl or substituted hydroxyl group directly attached to the same cyclic carbon atoms as the peroxygen linkage. Particularly advantageous cyclic peroxide compounds are those represented by the formula

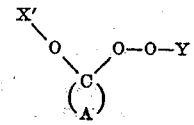

where X' represents a hydrogen atom, a hydroxyl radical or a hydrocarbon radical of 1 to 12 carbon atoms, that is the group X'—O— represents a hydroxyl, or a hydrocarbyloxy, or a hydroperoxy radical, —OOH. Y represents a hydrogen atom or an

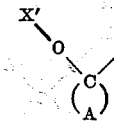

radical and A represents a divalent radical containing from three to nine directly connected carbon atoms in the unsubstituted portion of the diradical.

Cyclic peroxide compounds especially useful for producing the new diethylenic polycarboxylic acids of the invention are those obtainable by reacting together hydrogen peroxide and a cyclic ketone or the formula

wherein the symbol A is a divalent radical of the type previously indicated. These peroxides can be produced as described in Milas patent—U. S. 2,298,405—the products from equimolar amounts of cyclic ketone and hydrogen peroxide being, as pointed out by Criegee, Ann., vol. 565, page 7 (1949), and by Cooper and Davison, J. Chem. Soc., page 1180 (1952), chiefly the 1-hydroxy-1'-hydroperoxydicycloalkanyl peroxides

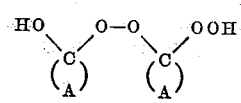

Preferred cyclic peroxides for use in the present process are the 1,1'-dihydroperoxydicycloalkanyl peroxides

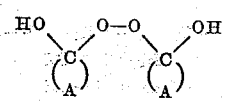

obtainable by the use of two moles of cyclic ketone per mole of hydrogen peroxide. Other cyclic peroxide compounds which can be alternatively used in the new reaction are, for example, the 1,1-dihydroperoxydicycloalkanyl peroxides

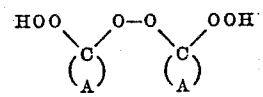

and the 1-hydroxycycloalkanylhydroperoxides

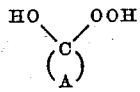

These can be produced in the same general way from reaction of the cyclic ketones with hydrogen peroxide in different proportions or under different conditions. Still other types of cyclic peroxides obtainable from the treatment of the said cyclic ketones with hydrogen peroxide can likewise be used. By carrying out the reaction of the cyclic ketone with hydrogen peroxide in an acidic solution in an alcohol, ether derivatives of the foregoing hydroxy cyclic peroxide compounds can be obtained. These compounds have the formula

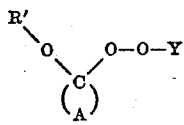

where R' represents the hydrocarbon radical of the alcohol used as solvent, for instance, a methyl radical when using methanol as solvent, and are included in the expression, cyclic peroxide compound obtainable by reacting a cyclic ketone with hydrogen peroxide, as used hereinafter. Other methods of producing cyclic peroxide compounds of this type include peroxidation of cyclic secondary ethers

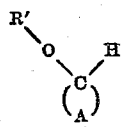

with oxygen in the presence of free radicals. R' in these formulae can be a hydrocarbon radical of 1 to 12 carbon atoms as methyl, ethyl, butyl, octyl, dodecyl, cyclohexyl, phenyl, tolyl, benzyl and like radicals, for example.

Cyclic peroxide compounds of the foregoing formulae which have been found to be particularly suitable in the process of the invention are those in which the divalent radical A is an unsubstituted hydrocarbon radical containing a divalent chain of 3 to 9 carbon atoms, or is a divalent chain of 3 to 9 carbon atoms substituted by one or more functional substituents such as nitro, cyano, carboxy, ester, ether, thioether and sulfone groups or halogen atoms. Among such preferred starting cyclic peroxide compounds are those wherein the divalent radical A consists of unsubstituted methylene groups, or contains methyl, ethyl, propyl, butyl, benzyl, phenyl, cyclohexyl, chloro, fluoro, hydroxy, methoxy, carboxy, carbalkoxy or keto substituents, are suitable in accordance with the invention, as are those in which the divalent radical A forms a part of a phenyl or cyclohexyl ring. Representative examples of such suitable divalent radicals are:

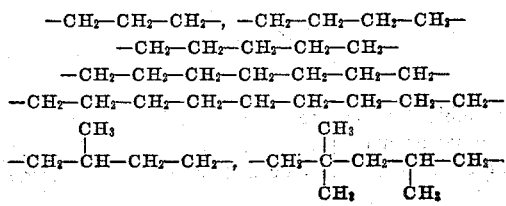

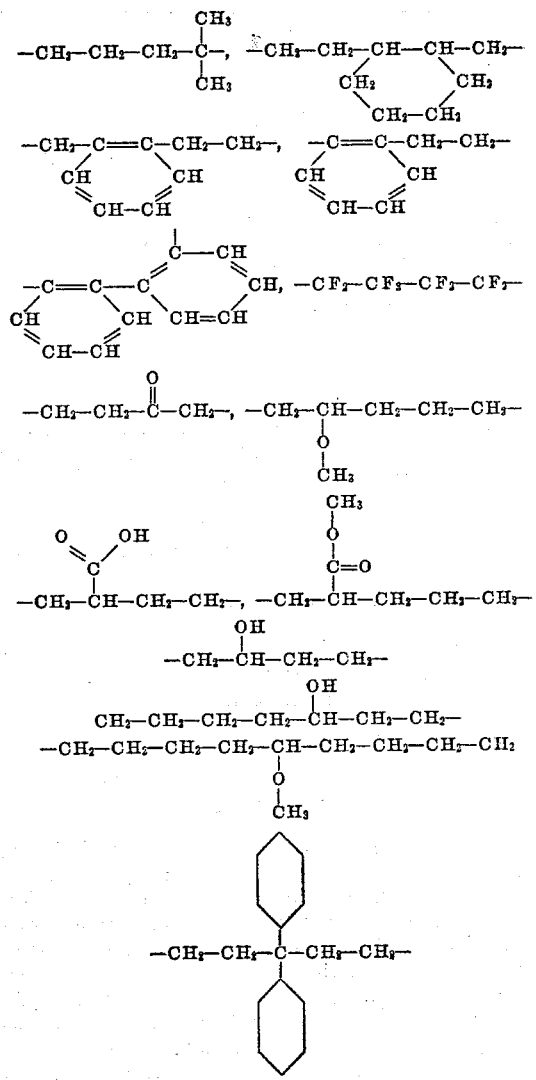

and like divalent radicals.

Especially useful cyclic peroxide compounds are those in which the divalent radical A contains only hydrogen or carbon atoms directly linked to the two carbon atoms to which its free bonds are attached. A particularly preferred subspecies is that in which A represents a divalent radical of the formula

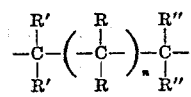

wherein R has the previously indicated significance, R' and R" represent hydrogen atoms or organic radicals preferably hydrocarbon radicals and $n$ is an integer equal to 1 to 7. Compounds of this type in which both R primes are hydrogen, offer special advantages, the products being of the formula

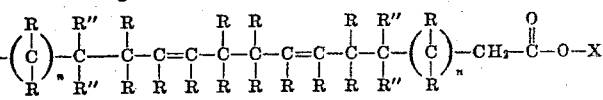

Because of their ready availability at low cost, cyclic peroxides of the type produced by reacting hydrogen peroxide with cyclopentanone, cyclohexanone, and the methyl cyclopentanones and methyl cyclohexanones are particularly useful starting compounds.

Cyclic peroxide compounds of the foregoing formula which can be successfully used as starting materials in the new process can also be produced by other known methods. Etherification of a cyclic hydroxyhydroperoxide such, for instance, as 1-hydroxycyclohexylhydroperoxide, and condensation between a cyclic hydroxyhydroperoxide and another hydroperoxide with elimination of hydrogen peroxide are other methods which can be used in preparing suitable substituted cyclic peroxides for use in the process. The preferred starting peroxides, however, are the cyclic peroxide compounds obtainable by reacting a cyclic ketone with hydrogen peroxide. The preferred compounds of this class are the dicyclic peroxide compounds the cyclic structure directly linked to each other by an oxygen-oxygen bridge and having the hydrxyl or hydrocarbyloxy groups directly attached to the same cyclic carbon atoms to which said peroxygen bridge is united.

As conjugated diethylenic compounds which can be successfully reacted with the foregoing cyclic peroxide compounds to produce diethylenic polycarboxylic acid compounds in accordance with the invention are included the conjugated diolefins of 4 to 18 carbon atoms, of which 1,3-butadiene, 1,3-pentadiene, isoprene, dimethyl-1,3-butadiene, 1,3,5-hexatriene, 2-ethyl-1,3-pentadiene, 2,4-octadiene, 1,1-dimethyl-3-tertiary butyl-1,3-butadiene, 2-phenyl-1,3-butadiene, 1,4-diphenyl-1,3-butadiene, 2-benzyl-1,3-butadiene, 2-cyclohexyl-1,3-butadiene, 2-(cyclohexene-3) - 1,3 - butadiene, 1,1 - diphenyl - 3,5 - hexadiene, cyclopentadiene, 1,3-cyclohexadine, 1-methyl-2,4-cyclopentadiene, 2-methyl-1,3-cyclopentadiene, the mono- and di-methyl-1,3-cyclohexadienes, 1-vinyl-1-cyclohexene, 1 - tertiary butyl -1,3 - cyclohexadine, and 1,3 - cycloheptadiene are typical, and substitution products of such conjugated diolefins, having as substituents functional groups such as hydroxy, nitro, cyano, carboxy, ester, ether, thioether, and sulfone groups or halogen atoms. As halogenated conjugated diethylenic compounds, those containing one or more atoms of fluorine, chlorine and/or bromine are preferred. Representative examples of suitable halogenated conjugated diethylenic starting materials are chloroprene, 2,3-dichloro-1,3-butadiene, 1 - chloro - 2 - methyl - 1,3 - butadiene, 2-chloro - 1,3 - pentadiene, 1 - chloro - 2,4 - cyclopentadiene, 1-chloromethyl-2,4-cyclohexadiene and the like, and the corresponding fluoro and bromo compounds. Other substituted conjugated diethylenic compounds which can be used successfully as starting materials are, for example, conjugated diethylenic alcohols such as 2,4-hexadien-1-ol, 1,3-hexadien-5-ol, 2,4-octadiene-6-ol and 2,4,6-octatrien-1-ol, etc., ethers such as 2-methoxy-1,3-butadiene, 2-ethoxy-1,3-butadiene, 1-ethoxy-2,3-cyclohexadiene, etc., carboxylic acids of which vinyl acrylic acid, sorbic acid (2,4-hexadienoic acid), 4-methyl-2,4-pentadienoic acid, and mucconic acid are typical, and esters of such acids such as the methyl, ethyl, isopropyl, tertiary butyl, 2-ethylhexyl, decyl and like esters. 1-cyano-1,3-butadiene, 3-nitro-1,3-butadiene, 1-methylmercapto-1,3-butadiene, 3-vinyl-3-sulfolene, and the like are examples of other suitable substituted conjugated diethylenic compounds which react with cyclic peroxide compounds under redox conditions in accordance with the invention. Mixtures of two or more of the conjugated diethylenic starting compounds can be reacted with one or more of the cyclic peroxide compounds used in the new process. As a rule, however, it is preferred to react a single conjugated diethylenic compound with a cyclic peroxide or mixture of such peroxides, since high yields of individual diethylenic polycarboxylic acid compounds are obtained instead of a mixture of such compounds, and recovery and purification of the individual products are simplified.

The reaction may be described as one which gives products which correspond to the addition, at each end of a chain representing two molecules of the starting conjugated diethylenic compound, of a radical

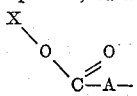

such as might be formed through opening of a primary ring of the starting cyclic peroxide compound. This explanation is not intended as descriptive of the mechanism of the reaction which is not essential to an understanding of the invention but is given to make more clear the nature of the diethylenic polycarboxylic acid compounds which are produced. While these products will be seen to be usually diethylenic dicarboxylic compounds, more than two carboxyl groups can be present therein when starting materials are used which already contain a carboxyl group. This is the case, for instance, when a cyclic peroxide compound from 3-carboxycyclohexanone is used to obtain a diethylenic tetracarboxylic acid. For example, 4,17-dicarboxy-8,12-eicosadiene-1,20-dioic acid is the major product when such peroxides are reacted with butadiene. It may also be noted that, even when using straight chain conjuated diethylenic compounds in the reaction, the polycarboxylic acid products, although predominantly of the type represented by the previously given general formula in which both ethylenic linkages are in the chain which connects the carboxyl groups, usually also contain a small amount (generally of the order of about 10% to 20%) of polycarboxylic acid compound having only one of the ethylenic linkages in such chain, the other ethylenic linkage being in a side chain. These co-products can be thought of as resulting from 1,2-addition of a molecule of starting conjugated diethylenic compound instead of 1,4-addition in the case of the formation of the major product. Whatever the explanation, the co-produced compounds, particularly the acids having one of their two ethylenic linkages in a side chain, are valuable products of the invention which it is usually unnecessary to separate from the principal product, although such separation can be carried out chromatographically or in other ways. The acids of both types can be recovered and used advantageously for many purposes in the form of their salts or esters, and these derivatives are intended to be within the scope of the following claims to the novel polycarboxylic acid compounds which are to be recognized as covering the new acids whether in free or combined form.

As previously indicated, the new reaction is carried out under redox conditions, the term "redox" denoting an oxidation-reduction reaction in which an electron transfer takes place with formation of a free radical. Any of the reducing agents applicable in redox reactions can be used in the present case as reducing agents for the cyclic peroxide compound employed. It has been found that ferrous ion is a particularly useful reducing agent in the reaction, but ions of other heavy metals having multiple valences can likewise be used. Examples of such suitable metal ions are chromous, vanadous, etc. Other types of reducing agents which are suitable are, for instance, sodium bisulfite, sodium formaldehyde sulfoxylate, l-ascorbic acid, one or more reducing sugars or the like, these reducing agents being most advantageously employed together with a small amount of ferrous or ferric or other multivalent metal ion to act as a promoter which is maintained in the reduced state by the other reducing agent present.

The reducing agent or mixture of reducing agents used are employed in an amount at least equivalent to, or preferably in excess of, for instance, up to about 10% excess, the stoichiometric requirement for the desired reduction of the cyclic peroxide compound present. It is usually also desirable to employ a stoichiometric excess of conjugated diethylenic compound in the reaction, suitable proportions being about 1.2 to about 5 moles of such diethylenic compound per mole of cyclic peroxide compound used.

The reaction is advantageously carried out under acidic conditions. It is usually desirable to add a part of the acid to a solution of the cyclic peroxide in the chosen solvent, about 0.5 to 2 equivalents of acid being suitable, and introduce the remaining acid, preferably about 0.5 to equivalents of acid per mole of cyclic peroxide compound, with the reducing agent. Sulfuric acid is an economical and effective acidifying agent, but other acidic compounds, preferably inorganic acids such as hydrochloric, phosphoric, and like acids, can be used, and also it is feasible to operate under neutral or basic reaction conditions, although as a rule these are less desirable with respect to yield and purity of product.

A mutual solvent for the reactants is also useful in the reaction. Organic solvents, which can be aqueous or anhydrous, can be used. Alcohols such as methyl, ethyl, isopropyl and tertiary butyl alcohols, or ethers, for instance, diethyl ether, dioxane, etc., or esters, as methyl or ethyl acetates, or ketones such as acetone or methyl ethyl ketone, and hydrocarbons, for example, benzene, can be employed as the reaction media which may also be water. When the reactants cannot be conveniently brought into mutual solution, they can be reacted in an emulsified state.

Temperatures of the order of about $-15°$ C. to about $50°$ C., more preferably temperatures in the range of about $0°$ C. to about $25°$ C., are suitable for the reaction, which is advantageously carried out at a pressure sufficient to maintain a liquid phase present and may be atmospheric or higher or lower pressure. The reaction is relatively rapid at these temperatures, and reaction times of about 30 minutes to about 240 minutes are usually sufficient for satisfactory conversions and yields of desirable products.

Various methods of carrying out the process of the invention can be employed—continuous, intermittent or batch operation being satisfactory. Since some of the cyclic peroxide compounds are explosive, the customary precautions in handling these compounds must be observed. One method which has been found useful in operating on a continuous scale is to continuously feed a solution of the cyclic peroxide compound chosen as starting material, and preferably acidified as previously indicated, into a closed, stirred mixer into which the conjugated diethylenic compound to be reacted therewith is also fed in and dissolved under rapid stirring and cooling. The resulting solution of the two reactants is continuously withdrawn and fed, together with a solution of the chosen redox reducing agent, preferably an acidified aqueous solution of ferrous sulfate, through a reaction coil provided with a jacket through which a temperature regulating medium is circulated, the rate of flow being controlled so as to insure mixing and a proper period of reaction. A similar order of addition of the reactants can be used in batchwise operation, or in either case the reactants can be introduced in other ways although such are generally less desirable.

Recovery and purification of the diethylenic polycarboxylic compounds produced by the new method can be carried out in any suitable way. In the case of the production of the free diethylenic polycarboxylic acids, the water-insoluble ferric salt is formed when employing the preferred reducing agent, namely, ferrous ions, unless the reaction is carried out under acid conditions as previously described. The acids can be recovered from these salts by acidification and extraction with a suitable organic solvent or by dissolving the ferric salt in glacial acetic acid and diluting with an inorganic acid, for instance 2 N hydrochloric acid. Recovery is much simplified when the reaction is carried out under acid conditions as described above and higher yields of pure acids are obtained. Where an alcohol is used as the solvent medium for reaction, the new acids can be obtained in the form of the corresponding neutral esters by heating the acidified mixture under esterification conditions. If desired, the free acids can be recovered from the esters by hydrolysis and distillation to remove the alcohol thus liberated. Alternatively, the esters or the free acids can be reacted with an inorganic base, such as the alkali metal or alkaline earth metal hydroxides, etc., or with an organic base, for instance, an amine such as the mono- or di-methyl amine, aniline, the ethanolamines, etc., to form the corresponding salts. However, the esters, particularly those of the lower aliphatic monohydric alcohols such as methanol, ethanol, etc., are valuable compounds and the new acids in this form are within the scope of the invention.

The following examples illustrate in more detail some of the suitable ways in which the invention can be carried out.

*Example I*

Into a three-necked flask equipped with a Tru-bore stirrer, dropping funnel and Dry-Ice condenser, and provided with a means of maintaining a nitrogen atmosphere, was introduced a solution of 75 g. of urea in 150 ml. of redistilled water. The flask was cooled to $-10°$ C. and 75–100 g. of butadiene was added, followed by 0.2 mole (26.4 g.) cyclohexanone peroxide (Lucidol Corp.)

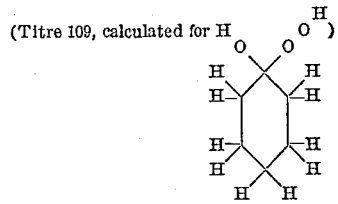

(Titre 109, calculated for $H_{12}O_2$)

To this mixture was added dropwise 0.2 mole ferrous ammonium sulfate hexahydrate dissolved in 350–400 ml. distilled water. The ferrous ammonium sulfate solution was added over a period of 2 hours while the whole was stirred vigorously. The butadiene was allowed to evaporate off and there remained a suspension of the iron salts of the reaction products. The residue, after evaporation of the butadiene, was treated with 4 N HCl, ethanol and ether to recover the organic acids and other products from the ferric salts. The alcohol ether extract was washed with water exhaustively until no more $FeCl_3$ dissolved in the water. The ether extract was then extracted with 4 N sodium hydroxide to remove the organic acids. The alkaline extract was acidified with 4 N HCl and the liberated acids extracted with ether. After washing and drying the ether solution, the ether was removed and a residue of organic acids remained (which, in part, crystallized). The weight of acids varied between 18–22 g. Yield: 53%–65% of theory for $C_{20}$ diethylenic dibasic acid,

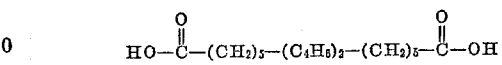

based on the cyclohexanone peroxide used. The same products were formed when hydrogen peroxide (1 mole) was added to a mixture of cyclohexanone (2 moles), water, urea and butadiene (in the amounts stated above), followed by slow addition of ferrous ammonium sulfate, or a suspension of ferrous pyrophosphate (one mole equivalent on the basis of the hydrogen peroxide used). The reaction is preferably carried out at $0°$ to $-10°$ C.

*Example II*

1,1'-dihydroxydicyclohexyl peroxide was prepared by adding, in portions, 50 g. of 34% hydrogen peroxide (0.5 mole) of 98 g. of cyclohexanone (1 mole) while maintaining the temperature below $40°$ C. by intermittent cooling with an ice bath, and then dissolving in 750 ml. of methanol containing 25 g. of concentrated sulfuric acid. The solution was cooled to $0°$ C. in a 2-liter 3-neck round-bottom flask equipped with mechanical stirrer, Dry Ice-acetone condenser, thermometer and dropping funnel. The dropping funnel was removed and 81 g. (1.5 moles) of butadiene was dissolved in the solution. The funnel was replaced and filled with a solution of 147 g. (0.53 mole) of ferrous sulfate heptahydrate and 25 g. of concentrated sulfuric acid in 250 ml. of water. The ferrous solution was added with stirring to the peroxide solution at 0° C. over a period of 1½ to 2 hours. After completion of the addition the mixture was warmed to 65° C. and the excess butadiene (52 g., 0.96 mole) collected in a Dry Ice-acetone trap. The mixture was then cooled, diluted with two liters of water and extracted with a 300 ml. portion of benzene. The benzene solution was dried over anhydrous sodium sulfate and distilled through a two-foot packed column. After removal of the benzene there was obtained 44 g. of cyclohexanone (0.45 mole), B. P. 83–85° C. (85 mm.). The pressure was reduced to 1 mm. and the kettle temperature raised to 200° C., but no other product distilled. The light brown bottoms weighed 84 g. (92% yield based on hydrogen peroxide; calculated as $C_{20}$ dimethyl ester). The residue was dissolved in 300 ml. of methanol containing 3 g. of p-toluenesulfonic acid catalyst and the mixture was allowed to reflux gently overnight. After dilution with one liter of water and extraction with 300 ml. of benzene, the benzene solution was washed with dilute sodium carbonate solution, water, and dried over anhydrous sodium sulfate. Claisen distillation afforded the following cuts after removal of solvent:

Cut I, 95–190° C. (1 mm.), 6 g.
Cut II, 190–220° C. (1 mm.), 69 g. $u_D^{20}$ 1.4693
Residue, 7 g.

Analysis of material boiling in the range of cut II gave the following results:

| | Found | Calc'd for $C_{22}H_{38}O_4$ (366.52) |
|---|---|---|
| C | 71.6 | 72.1 |
| H | 10.3 | 10.4 |
| Ester value | 0.53 eq./100 g. | 0.54 eq./100 g. |
| Iodine No | 136 g.100 g. | 138 g.100 g. |
| Hydroxyl value | 0.007 eq./100 g. | 0. |

Cut II represents a 75% yield of dimethyl ester based on the hydrogen peroxide used. Analysis showed the product to be a mixture of about 80% of dimethyl 8,12-eicosadiene-1,20 dioate, $$CH_3-O-\overset{O}{\overset{\|}{C}}-(CH_2)_6-CH=CH-CH_2-CH_2-CH=CH-(CH_2)_6-\overset{O}{\overset{\|}{C}}-O-CH_3$$

and the remainder dimethyl 8-vinyl-10-octadecene-1,18-dioate,

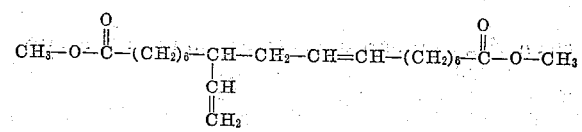

Example III

By using an equivalent amount of l-ascorbic acid together with about one-sixtieth its weight of ferrous sulfate as the redox reducing agent under the conditions employed in Example II, the same esters are obtained in only slightly lower yield.

Example IV 1-hydroxy-1'-hydroperoxydicyclohexyl peroxide, prepared by reacting hydrogen peroxide with cyclohexanone in a mole ratio of 1 to 1, was reacted with butadiene using the method of Example II. The same dimethyl esters of the $C_{20}$ diethylenic dicarboxylic acids were obtained in a yield of 65% based on the peroxide used.

Example V

Using isoprene instead of butadiene under the conditions of Example II, a similar good yield of the dimethyl esters of isomeric $C_{22}$ diethylenic dicarboxylic acids, of which about 80% to 85% were the esters of dimethyl-8,12-eicosadiene-1,20-dioic acids having the methyl groups in the 8,12-, the 8,13- and the 9,12-positions, was obtained. The remaining acids were 8,10- and 8,11-dimethyl-8-vinyl-10-octadecene-1,18-dioic acids, and 10- and 11-methyl-8-isopropenyl-10 - octadecene - 1,18 - dioic acids.

Example VI

When chloroprene was used as the conjugated diethylenic compound in the method of Example I, the recovered product was a mixture of dimethyl esters of dichloro-8,12-eicosadiene-1,20-dioic acids, the indications being that no branched chain acids were formed.

Example VII

Cyclopentanone peroxide produced by reacting cyclopentanone and hydrogen peroxide in a mole ratio of 2:1, reacted in methanol solution with butadiene (3 moles per mole of peroxide) at −10° C. to −5° C. in the presence of 1.1 moles of ferrous sulfate per mole of peroxide, gives under acid conditions, as the chief product after esterification, dimethyl 7,11 - octadecadiene - 1,18-dioate together with a small amount of dimethyl 7-vinyl-9-hexadecene-1,16-dioate (19% total yield).

Calculated for $C_{18}$ dimethyl ester, $C_{20}H_{34}O_4$:
 C, 71.0; H, 10.1
 Ester value, 0.59 eq./100 g.
 Iodine No., 150 g./100 g.
Found:
 C, 71.0; H, 10.1
 Ester value, 0.59 eq./100 g.
 Iodine No., 152 g./100 g.

Example VIII

By reacting isoprene with cyclopentanone peroxide under the conditions of Example VII, dimethyl esters of the corresponding dimethyl dicarboxylic acids of 20 carbon atoms are produced in good yield.

Example IX

On substituting chloroprene for butadiene in the reaction of Example VII, the product is substantially solely the dimethyl ester of dichloro-7,11-octadecene-1,18-dioic acid.

Example X

The peroxide derived by reacting 4-methylcyclohexanone with hydrogen peroxide gives, in reaction with butadiene under the conditions of Example II, a yield of dimethyl esters of about 55% based on the amount of hydrogen peroxide used. These esters yield, on hydrolysis, 4,17-dimethyl-8,12-eicosadiene - 1,20 - dioic acid, and about one-sixth as much 4,15-dimethyl-8-vinyl-10-octadecene-1,18-dioic acid is obtained.

Example XI

A mixture of 112 g. (1.0 mole) each of 3- and 4-methylcyclohexanones was dissolved in 1500 ml. of methanol containing 50 g. of concentrated sulfuric acid. To this was added 110 g. (1.0 mole) of 31% hydrogen peroxide with little or no heat effect being observed. After standing at room temperature for two hours, the mixture was charged to a reaction kettle of 3 liters' capacity, equipped with a stirrer, Dry Ice-acetone condenser and dropping funnel, and treated at 0° C. with 124 g. of butadiene. There was next added at 0° C. over 2 hours a solution of 292 g. (1.05 mole) of ferrous sulfate heptahydrate in 550 g. of water containing 50 g. of sulfuric acid.

Excess butadiene (64 g.) was collected in the usual manner and the bottoms were worked up by dilution with water and extraction by chloroform. After removal of solvent on the steam bath, distillation was carried out through a two-foot packed column to give 108 g. (0.97 mole) of recovered 3- and 4-methylcyclohexanones, B. P. 62° C.–65° C. (20 mm.). The bottoms (150 g.) were esterified with methanol by refluxing in the presence of paratoluenesulfonic acid catalyst and then Claisen distilled to recover 105 g. of product boiling 180° C.—230° C. at 1 mm. From this fraction there was obtained a 53% yield, based on the hydrogen peroxide applied, of a mixture of isomeric dimethyl esters of chiefly 3,4-, 3,17-, 4,17- and 4,18-dimethyl-8,12-eicosadiene-1,20-dioic acid. This mixture of esters has a pour point of less than —70° C. Hydrogenation of a portion of these esters at 100° C. with Raney nickel as catalyst gave dimethyl ester of the saturated $C_{22}$ dicarboxylic acid which analyzed as follows:

|  | Found | Theory ($C_{24}H_{46}O_4$) |
|---|---|---|
| C | 72.4 | 72.3. |
| H | 11.6 | 11.6. |
| Ester value | 0.48 eq./100 g. | 0.50 eq./100 g. |

*Example XII*

The same mixture of methylcyclohexanones and hydrogen peroxide in acidic methanol solution (described in Example XI above) was allowed to stand overnight at room temperature. After charging 136 g. (2.0 moles) of isoprene (99% purity), the ferrous sulfate solution was added dropwise at <20° C. over a two-hour period. Direct distillation from the reaction kettle allowed the recovery of 77 g. (1.13 moles) of isoprene, B. P. 34° C. The kettle contents were diluted with excess water and extracted wtih chloroform. After removal of the latter, there were obtained 126 g. (1.13 moles) of recovered mixed ketones, B. P. 90° C.–100° C. (80 mm.). Bottoms, in the amount of 150 g., were converted to the ethyl ester in the usual manner. Claisen distillation gave the following cuts:

Cut I, 62° C.–190° C. (1 mm.), 44 g.
Cut II, 190–220° C. (1 mm.), 76 g.
Residue, 36 g.

Cut II represents a 34% yield (based on hydrogen peroxide) of diethyl esters of isomeric $C_{24}$ diethylenic dicarboxylic acid, the chief product being a mixture of esters of tetramethyl-8,12-eicosadiene-1,20-dioic acids having the four methyl groups in the 3- or 4-, 8- or 9-, 12- or 13-, and 17- or 18-positions, respectively. This product has a pour point of less than —75° C. and the theoretical ester value of 0.44 equivalent per 100 grams.

*Example XIII*

1,1'-dimethoxydicyclohexyl peroxide, produced by reacting cyclohexanone with hydrogen peroxide (mole ratio 2:1) in acidic methanol solution while cooling, was reacted with ferrous sulfate and butadiene under the conditions of Example VII to obtain the methyl esters of 8,12-eicosadiene-1,20-dioic acid.

Results similar to those described above were obtained when isoprene and chloroprene were used instead of butadiene. However, in the two latter cases very little of the diunsaturated compound containing the terminal double bond was formed. The percentage of terminal and nonterminal double bonds was determined by titration with perbenzoic acid.

As previously indicated, the new diethylenic polycarboxylic acids of the invention and their esters are espectially valuable products. The esters of the branched chain dicarboxylic acid esters are a particularly important sub-class of the compounds of the invention because of their unique properties. These compounds, of which the esters of Examples XI and XII are typical, have an unexpected combination of low pour points with viscosity and lubricating characteristics which make them unusually effective as synthetic lubricating oils and as additives for lubricating oils. For this purpose, the esters having two to four methyl groups connected to different carbon atoms of the chain connecting the carboxylic acid radicals are preferred, and most preferably the mixed isomeric products of this type produced in reacting cyclic peroxides, obtainable by reacting mono- and di-methyl substituted cyclic peroxides and hydrogen peroxide, with methyl-substituted conjugated diolefinic hydrocarbons such as isoprene, 2,3-dimethyl-1,3-butadiene, etc.

It will thus be seen that the invention offers numerous advantages. It is capable of many variations not only with respect to the cyclic peroxide compounds which can be used and the conjugated diolefinic compounds which can be reacted therewith but also with regard to the conditions under which the new reaction can be carried out. The invention is therefore not restricted to the examples given by way of illustration, nor by any theory proposed in explanation of the new results which are obtained.

We claim as our invention:

1. A process of producing a compound of the group consisting of diethylenic polycarboxylic acids and esters thereof, which comprises treating a cyclic peroxide compound having 4 to 10 carbon atoms in the primary ring, of the formula

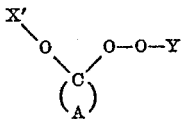

wherein A is a radical having a divalent chain of 3 to 9 carbon atoms, X' is a radical of the group consisting of hydrogen, and acyclic hydrocarbon and aromatic radicals of not more than 12 carbon atoms, and Y is a member of the group consisting of the hydrogen atom and the

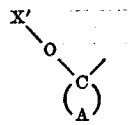

radicals in which X' and A are radicals as above defined, with a conjugated diene of 4 to 18 carbon atoms per molecule, an inorganic acid and a redox reducing agent at about —15° to about 50° C.

2. A process of producing a compound of the group consisting of diethylenic polycarboxylic acids and esters thereof which comprises treating a dicyclic peroxide compound having primary rings of 4 to 10 carbon atoms directly united to each other by an oxygen-oxygen bridge and having a member of the group consisting of hydroxy, acyclic and aromatic hydrocarbyloxy radicals of not more than 12 carbon atoms linked directly to the same cyclic carbon atoms as said peroxygen bridge with a redox reducing agent, an inorganic acid and with a conjugated diene of 4 to 18 carbon atoms of the group consisting of diethylenic hydrocarbons and halo, hydroxy, carboxy, carboxyalkyl, and alkoxy substitution products thereof at about —15° to about 50° C.

3. A process of producing a diethylenic polycarboxylic acid which comprises treating a 1-hydroxydicycloalkanyl peroxide having a primary hydrocarbon ring of 5 to 6 carbon atoms together with a conjugated diethylenic hydrocarbon of 4 to 18 carbon atoms, an inorganic acid and with a redox reducing agent at about —15° to about 50° C.

4. A process of producing a diethylenic dicarboxylic acid which comprises treating together 1,1'-dihydroxydicyclohexyl peroxide, a conjugated diethylenic aliphatic hydrocarbon of 4 to 18 carbon atoms, about 1 to about 4 equivalents of inorganic acid per molecule of said peroxide, and a redox reducing agent at about —15° to about 50° C.

5. A process of producing 8,12-eicosadiene-1,20-dioic acid which comprises treating together 1,1'-dihydroxydicyclohexyl peroxide, butadiene, an inorganic acid and a redox reducing agent at about —15° to about 50° C.

6. A process in accordance with claim 5 wherein the treatment is carried out in the presence of about 1 to 4 equivalents of sulfuric acid per mole of said peroxide and with ferrous ion as the reducing agent at about $-15°$ to about $50°$ C.

7. A process of producing a diethylenic dicarboxylic acid which comprises treating together a 1,1'-dihydroxydicyclopentyl peroxide, a conjugated diethylenic hydrocarbon of 4 to 18 carbon atoms, an inorganic acid, and a redox reducing agent at about $-15°$ to about $50°$ C.

8. A process of producing a diethylenic dicarboxylic acid ester which comprises treating a 1-hydrocarbyloxy substituted cyclic peroxide wherein said hydrocarbyloxy group is an acylic hydrocarbyloxy group containing 1 to 12 carbon atoms and having the peroxide group attached to a saturated hydrocarbon ring of 4 to 10 carbon atoms, with a conjugated diene of 4 to 18 carbon atoms, an inorganic acid and with a redox reducing agent at about $-15°$ to about $50°$ C.

9. A process of producing a dialkyl ester of a diethylenic dicarboxylic acid which comprises treating a solution of a 1-alkoxycyclohexane peroxide having 1 to 12 carbon atoms in said alkoxy group containing about 0.5 to 2 equivalents of inorganic acid per mole of said peroxide with a conjugated diethylenic hydrocarbon of 4 to 18 carbon atoms and a solution of ferrous sulfate containing about 0.5 to 2 equivalents of inorganic acid per mole of said peroxide at about $-15°$ to about $+50°$ C.

References Cited in the file of this patent

UNITED STATES PATENTS

| | | |
|---|---|---|
| 2,298,405 | Milas | Oct. 13, 1942 |
| 2,352,461 | Walker | June 27, 1944 |
| 2,436,269 | Scott | Feb. 17, 1948 |
| 2,601,223 | Roedel | June 24, 1952 |
| 2,680,713 | Lindsey et al. | June 8, 1954 |
| 2,811,551 | Coffman et al. | Oct. 29, 1957 |

OTHER REFERENCES

Dieterle et al.: Chem. Abstracts, 32 (1938), 2138–9.